United States Patent
Hirata

(10) Patent No.: US 7,937,441 B2
(45) Date of Patent: May 3, 2011

(54) DATA-CONTROL DEVICE AND METHOD OF CONTROLLING SAME

(75) Inventor: Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 11/535,651

(22) Filed: Sep. 27, 2006

(65) Prior Publication Data

US 2007/0097436 A1 May 3, 2007

(30) Foreign Application Priority Data

Nov. 1, 2005 (JP) ................................ 2005-318742

(51) Int. Cl.
*G06F 15/16* (2006.01)

(52) U.S. Cl. ........................................ 709/204; 709/205

(58) Field of Classification Search .................. None
See application file for complete search history.

(56) References Cited

U.S. PATENT DOCUMENTS

| | | | |
|---|---|---|---|
| 6,757,684 B2 * | 6/2004 | Svendsen et al. | 1/1 |
| 6,892,220 B2 | 5/2005 | Seol | |
| 7,353,252 B1 * | 4/2008 | Yang et al. | 709/204 |
| 7,620,902 B2 * | 11/2009 | Manion et al. | 709/204 |
| 2004/0169684 A1 * | 9/2004 | Orth et al. | 345/804 |
| 2004/0172440 A1 | 9/2004 | Nakajima et al. | |
| 2005/0044146 A1 * | 2/2005 | Nassor et al. | 709/205 |
| 2006/0064470 A1 * | 3/2006 | Sargent et al. | 709/219 |
| 2006/0242238 A1 * | 10/2006 | Issa | 709/204 |
| 2007/0005694 A1 * | 1/2007 | Popkin et al. | 709/204 |

FOREIGN PATENT DOCUMENTS

JP    2001-209570 A    8/2001

* cited by examiner

*Primary Examiner* — Hassan Phillips
(74) *Attorney, Agent, or Firm* — Canon USA, Inc. IP Division

(57) ABSTRACT

A data-processing device which receives data transmitted from at least one other data-processing device on a network is provided. The data-processing device acquires information about a state of the other data-processing device, and outputs data items provided by the other data-processing device and information about a relation between the data items provided by the other data-processing device according to the acquired state information.

22 Claims, 12 Drawing Sheets

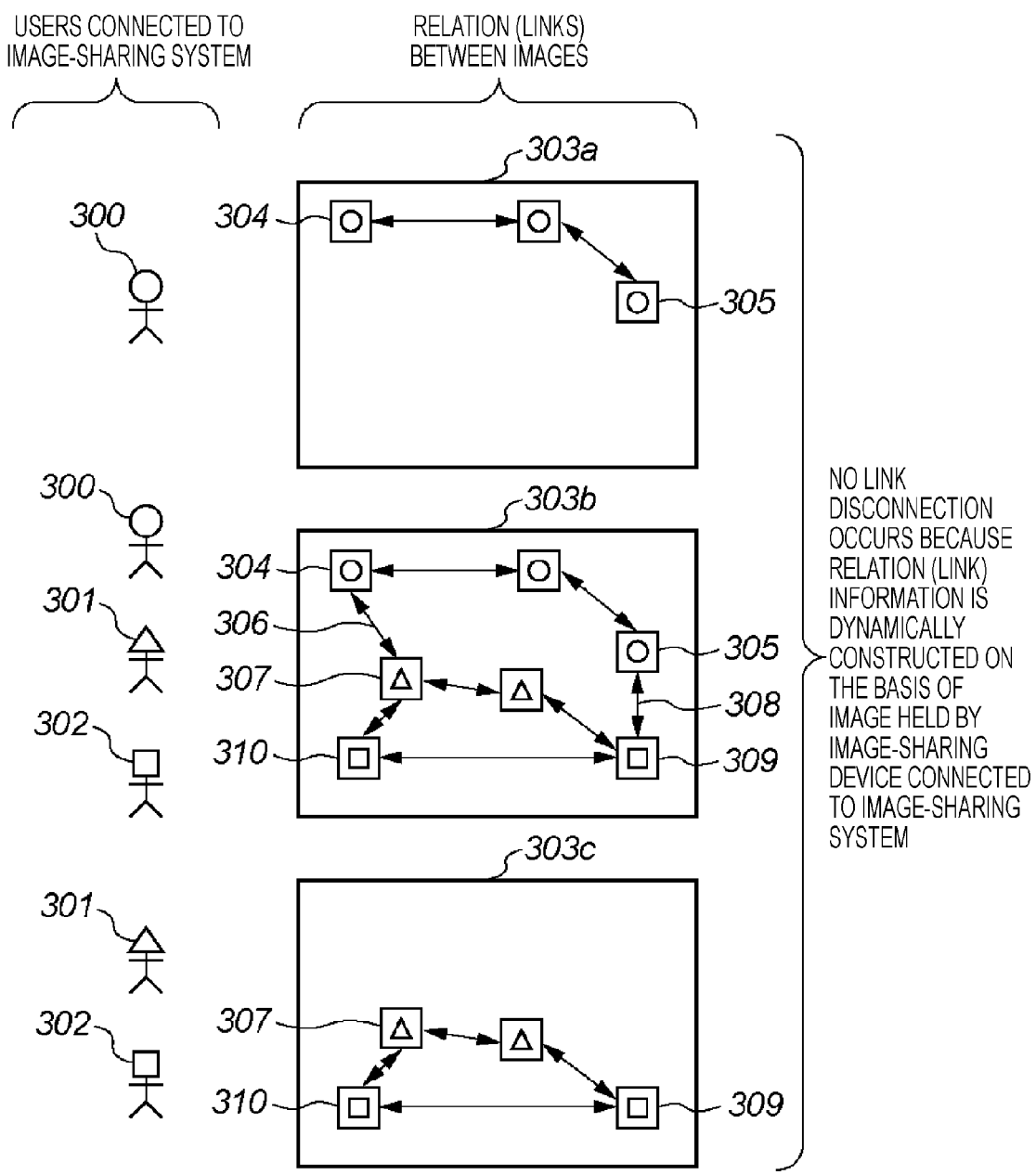

FIG. 6

| IMAGE NAME (600) | PHOTOGRAPHING DATE (601) | PHOTOGRAPHING LOCATION (602) | LINK DESTINATION (603) | |
| --- | --- | --- | --- | --- |
| | | | USER | IMAGE |
| A1.jpeg | 27/06/2005 | PARK | A | A2.jpeg |
| | | | B | B1.jpeg |
| A2.jpeg | 27/06/2005 | PARK | A | A1.jpeg |
| | | | A | A3.jpeg |
| A3.jpeg | 27/06/2005 | PARK | A | A2.jpeg |
| | | | C | C3.jpeg |

DATA-CONTROL DEVICE AND METHOD OF CONTROLLING SAME

BACKGROUND OF THE INVENTION

1. Field of the Invention

The present invention relates to a data-processing device which receives data transmitted from another data-processing device provided on a network, a method of controlling the data-processing device, and a program.

2. Description of the Related Art

In recent years, data-providing services using the Internet have been developed and are available for enabling users to share data. Data-providing services may allow for uploading image data to a server and notifying other users of the uniform resource locator (URL) of an image-storage location through an electronic mail or the like so that the notified users on the Internet can share the uploaded image data. Further, data-providing services are available that allow for storing a single album including a plurality of image-data items that are transferred from a user and that are associated with one another and releasing the album. According to an example release service, upon being notified that the album is released, another user can see the album by using a personal computer (PC) and/or a mobile information-communication terminal according to details on the notification.

The above-described services allowing the users to see and share the image data or the like have been achieved by using client-server systems including a server that provides information and a client that receives the information transmitted from the server. In the client-server system, the relationship between an information server and an information recipient can be clearly perceived. Further, in the client-server system, a heavy load is often placed on the information server and management of the information server often requires complicated procedures.

For solving the above-described problems of the client-server systems, peer-to-peer (P2P) systems have been proposed. The P2P system does not require the devices and/or apparatuses corresponding to the server and/or the client used in the client-server system, but includes a plurality of peers having functions of both the server and the client. In the P2P system, the information server and the information recipient are equivalent with each other and processing loads are scattered over the entire network.

There has been proposed a "Napster (Registered Trademark)" system, as one of known P2P systems. The Napster system allows for exchanging music data between private users via the Internet so that any user can obtain the music data. In the Napster system, a PC of the user is connected to a central server managed by Napster Inc. and a list of speech files stored in the user's PC is transmitted to the server. The music-file list is shared by Napster users so that any one of the users can search for a music file held by another user and download the searched music file. The central server only provides file-search databases and/or controls user connections. The music data is transmitted and/or received between computers of the users, where the computers are directly connected with one another. After the "Napster" system was released, a "Gnutella" system was released. The Gnutella system does not require the device and/or apparatus corresponding to the central server used in the Napster system. Namely, all of data items are directly transmitted and/or received between the computers of users in a bucket-brigade manner.

Thus, there are at least two types of P2P systems including a hybrid-type P2P system and a pure-type P2P system. In the hybrid-type P2P system, data is transmitted and/or received via the medium of the central server. In the pure-type P2P system, the data is transmitted in the bucket-brigade manner.

United States Patent Application 20040172440 discloses a technology relating to an example system that allows for seeing and sharing data by using the above-described P2P systems. Namely, United States Patent Application 20040172440 proposes an environment where users can share image data by using a P2P network. According to the technology disclosed in United States Patent Application 20040172440, upload processing is not required and any user can easily obtain a print with desired finished quality at a nearby laboratory shop.

Thus, according to the frequently used client-server-type data sharing systems, heavy loads are placed on the information server and/or the server management requires complicated procedures. However, since all of the data items shared by the users are uploaded to the server, and a manager strictly manages the server so that the data sharing system can operate with stability, the users can access the server and see the data items at any desired time.

In the P2P data-sharing systems, the data items shared by the users are not uploaded to the server, but stored in data-sharing devices of the users. Further, the data-sharing devices of the users are not necessarily connected the network at all times. Therefore, it may be difficult for the user who wants to see the data items to see the entire data items existing in the data-sharing system at all times.

Further, when a link is established between data items existing in the data-sharing system and the data items are associated with each other, it is difficult to provide the entire data items at all times, which causes an error such as link disconnection.

SUMMARY OF THE INVENTION

Embodiments of the present invention allow for managing information about a relation between data items with precision, the data items being provided by other data-processing devices.

According to an aspect of the present invention, a first data-processing device is provided which is capable of receiving data transmitted from at least one second data-processing device provided on a network. The first data-processing device includes an acquisition unit which acquires information about a state of the second data-processing device, and an output unit which outputs data items provided by the second data-processing device and information about a relation between the data items provided by the second data-processing device according to the acquired state information.

According to another aspect of the present invention, a method is provided for controlling a first data-processing device which receives data transmitted from at least one second data-processing device. The method includes acquiring information about a state of the second data-processing device, and outputting data items provided by the second data-processing device and information about a relation between the data items provided by the second data-processing device according to the acquired state information.

Further features of the present invention will become apparent from the following description of exemplary embodiments with reference to the attached drawings.

BRIEF DESCRIPTION OF THE DRAWINGS

FIG. 3 illustrates a P2P-data-sharing system according to an embodiment of the present invention.

FIG. 6 shows example meta data that is managed by an image-management unit of the image-sharing device according to an embodiment of the present invention, where the meta data is managed along with image data.

DESCRIPTION OF THE EMBODIMENTS

Hereinafter, embodiments of the present invention will be described in detail with reference to the attached drawings. The embodiments described below do not limit the present invention relating to Claims. Further, every combination of features described in the above-described embodiments may not be necessary to achieve the present invention. In the embodiments described below, image data is used, as data. Namely, an image-sharing system, an image-sharing device, and an image-sharing method are described in the embodiments described below, by way of example.

First Exemplary Embodiment

Figure 1:
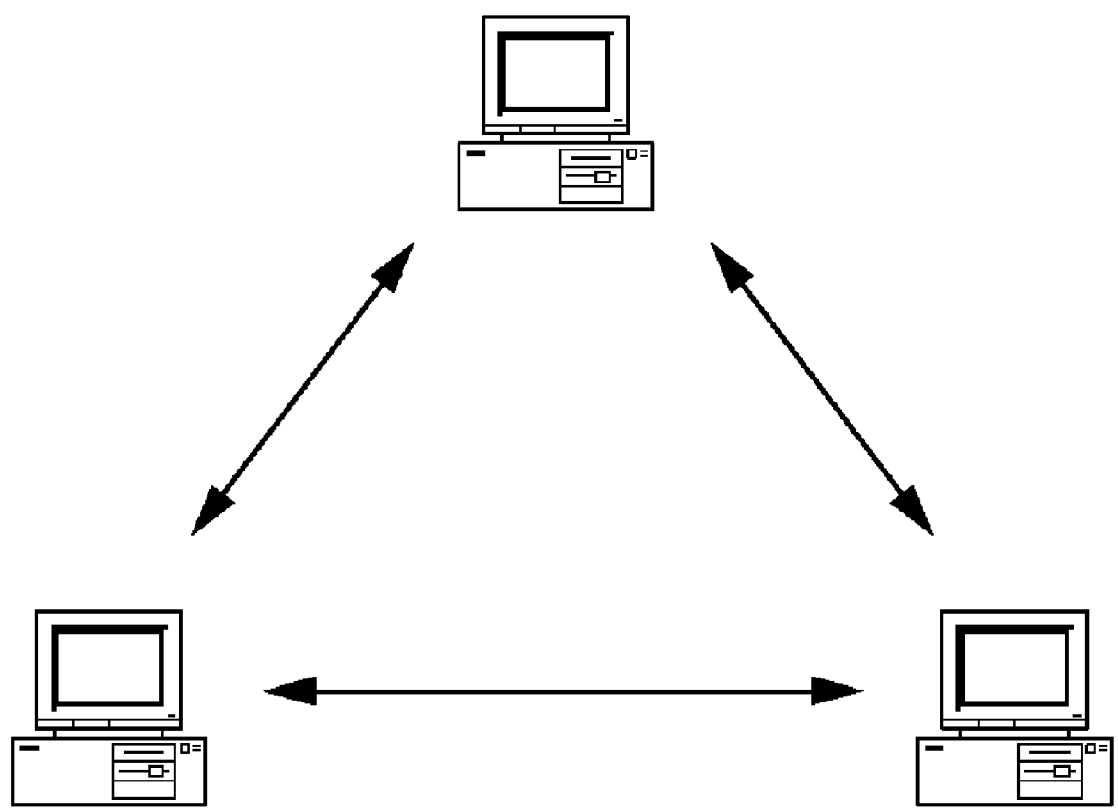
FIG. 1 illustrates a pure-type P2P system.

A first embodiment of the present invention is used for a pure-type P2P system shown in FIG. 1, for example.

Figure 2A:
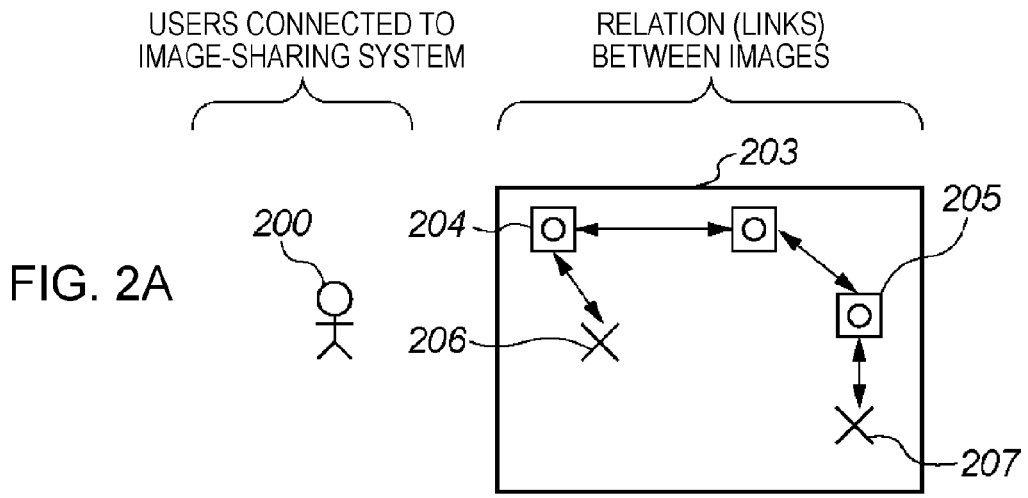
FIGS. 2A, 2B and 2C illustrate an example of various connection states of a P2P-data-sharing system.
Figure 2B:
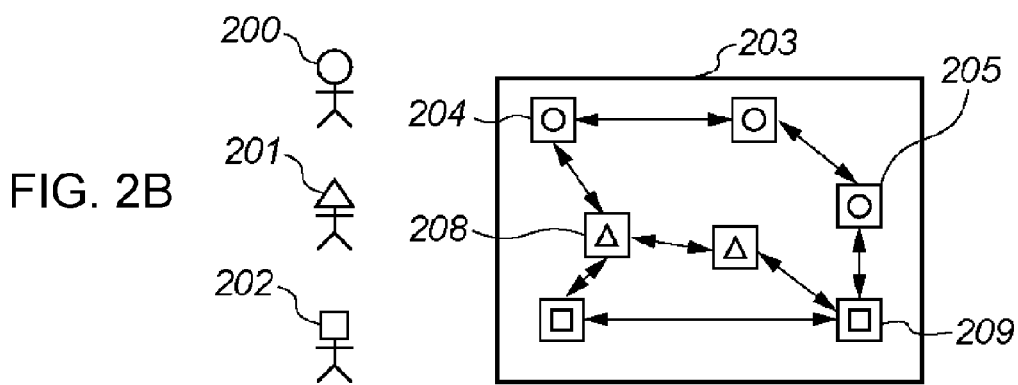
Figure 2C:
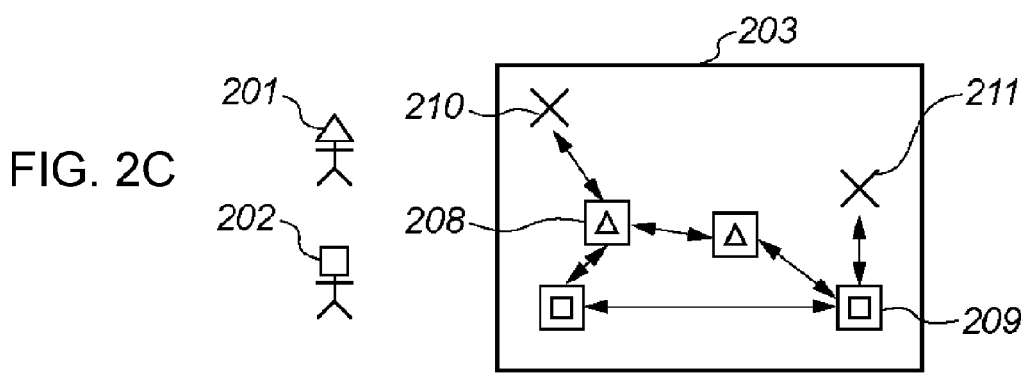

Each of FIGS. 2A, 2B, and 2C is a conceptual illustration of an example P2P-data sharing system. FIG. 3 particularly shows a P2P-data-sharing system according to the first embodiment. A frame 203 shown in each of FIGS. 2A, 2B, and 2C, and frames 303a, 303b, and 303c shown in FIG. 3 conceptually show relations (links) between image-data items included in the image-sharing system. That is to say, FIGS. 2A, 2B, 2C, and 3 show model networks wherein data items provided by image-sharing devices of users 200, 201, 202, 300, 301, and 302 are shown, as thumbnails.

In FIG. 2A, two image-data items become valid in addition to an image-data item 204 when the image-sharing device of the user 200 is connected to the P2P image-sharing system. Here, the image-data item 204 includes information about a relation (a link) between the image-data item 204 and an image-data item 208 (FIG. 2B) held by the image-sharing device of the user 201. Further, an image-data item 205 includes information about a relation (a link) between the image-data item 205 and an image-data item 209 (FIG. 2B) held by the image-sharing device of the user 202. Therefore, if only the image-sharing device of the user 200 is connected to the P2P image-sharing system, link disconnection occurs for each of the image-data items 204 and 205, as shown by link disconnections 206 and 207. FIG. 2A shows a display screen image produced by the image-sharing device of the user 200 when the image-sharing device of the user 200 is connected to the image-sharing system and the image sharing systems of the users 201 and 202 are not connected to the image-sharing system.

On the other hand, FIG. 2B shows the state where the image-sharing devices of the users 200, 201, and 202 are connected to the P2P image-sharing system (the state shown in FIG. 1, for example). In that case, no link disconnection occurs. That is to say, the image-sharing devices of all of the users who should access to the image-sharing system are connected to the image-sharing system and the entire image-data items can be used. In that case, any image-data item can be seen. In the frame 203 shown in each of FIGS. 2A to 2C, a symbol O indicates an image-data item held by the image-sharing device of the user 200, a symbol Δ indicates an image-data item held by the image-sharing device of the user 201, and a symbol □ indicates an image-data item held by the image-sharing device of the user 202.

In comparison with the state shown in FIG. 2A, FIG. 2B shows the state where the link disconnection 206 is cancelled when the image-data item 208 held by the image-sharing device of the user 201 becomes usable and the link disconnection 207 is cancelled when the image-data item 209 held by the image-sharing device of the user 202 becomes usable. FIG. 2B shows display screen images produced by the image sharing devices of the users 200, 201, and 202 when the image-sharing devices of the users 200, 201, and 202 are connected to the image-sharing system.

However, since there is no guarantee that all of the users are connected to the P2P image-sharing system at all times, it is difficult to maintain the above-described state. For example, when the image-sharing device of the user 200 is disconnected from the P2P image-sharing system, as shown in FIG. 2C, it becomes difficult to use the image-data item 204 or the like held by the image-sharing device of the user 200 via the image-sharing system. Therefore, the information about a relation (a link) between the image-data items 204 and 208 enters a disconnection state, as indicated by a link disconnection 210. Further, information about a relation (a link) between the image-data items 205 and 209 enters the disconnection state, as indicated by a link disconnection 211. FIG. 2C shows a screen image produced by each of the image-sharing devices of the users 201 and 202 when the image-sharing device of the user 200 is not connected to the image-sharing system and those of the users 201 and 202 are connected to the image-sharing system.

On the other hand, according to the first embodiment illustrated in FIG. 3, a search is made for at least one other image-sharing device connected to the image-sharing system when the image-sharing device of a user 300 is connected to the image-sharing system. When no other image-sharing device is found at that time, information 306 about a relation (a link) between an image-data item 304 and an image-data item 307 held by an image-sharing device of a user 301, and information 308 about a relation (a link) between an image-data item 305 and an image-data item 309 held by an image-sharing device of a user 302 are invalidated. That is to say, the link information is constructed so that no link disconnection occurs by invalidating information about the relations (links) between the image-data items held by the image-sharing devices other than the image-sharing device of the user 300. A frame 303a shows a screen image produced by the image-sharing device of the user 300 when the image-sharing device of the user 300 is connected to the image-sharing system and the image-sharing devices of the users 301 and 302 are not connected to the image-sharing system.

On the other hand, a frame 303b shows the state where the image-sharing devices of the users 300, 301, and 302 are connected to the image-sharing system (the state shown in FIG. 1, for example). In that case, the image-sharing devices of all of the users who should access to the image-sharing system are connected to the image-sharing system and the entire image-data items can be used. In that case, every image-data item can be seen at any time without suffering from link disconnections. That is to say, the information 306 about a relation (a link) between the image-data item 304 held by the image-sharing device of the user 300 and then image-data item 307 held by the image-sharing device of the user 301 is validated. Further, the information 308 about a relation (a link) between an image-data item 305 held by the image-sharing device of the user 300 and the image-data item 309 held by the image-sharing device of the user 302 is validated.

Further, the frame 303b shows a display-screen image produced by each of the image-sharing devices of the users 300, 301, and 302 when the image-sharing devices of the users 300, 301, and 302 are connected to the image-sharing system. The symbol O indicates an image-data item held by the image-sharing device of the user 300, the symbol Δ indicates an image-data item held by the image-sharing device of the user 301, and the symbol □ indicates an image-data item held by the image-sharing device of the user 302.

Namely, the image-sharing device of the user 300 acquires information about the states of the image-sharing devices of the users 301 and 302. Further, the image-sharing device of the user 300 transmits image-data items (307, 309, 310, and so forth) provided by the image-sharing devices of the users 301 and 302, and information about relations (links) between the image-data items provided by the image-sharing devices of the users 301 and 302 according to the state of each of the image-sharing devices of the users 301 and 302, as shown in the frame 303b. Further, the image-sharing device of the user 300 transmits information about the relations (links) (306, 308, and so forth) between the image-data items provided by the image-sharing devices of the users 300, 301, and 302 along with the image-data items (304, 305, and so forth) provided by the image-sharing device of the user 300 according to the state of each of the image-sharing devices of the users 301 and 302.

Further, according to the first embodiment, a frame 303c shows the following state. First, the image-sharing devices of all of the users are connected to the image-sharing system. Then, the image-sharing device of the user 300 is disconnected from the image-sharing system so that the image-data items including the image-data item 304 or the like held by the image-sharing device of the user 300 become unusable. In that case, image-sharing devices (the image-sharing devices of the users 301 and 302) other than the image-sharing device of the user 300 detect that the image-sharing device of the user 300 is disconnected from the image-sharing system, and the information 306 and the information 308 about relations (links) between the image-data items 307 and 309, and the image-data items 304 and 305 held by the image-sharing device of the user 300 are invalidated. Thus, the relation information is constructed so that no link disconnection occurs.

Thus, according to the first embodiment, image-data items are dynamically related to each other in consideration of a dynamically changing configuration of usable image-sharing devices. Subsequently, it becomes possible to provide a user interface suffering from no link disconnection even though the P2P image-sharing system is used. The frame 303c shows the screen image produced by each of the image-sharing devices of the users 301 and 302 when the image-sharing device of the user 300 is not connected to the image-sharing system and the image-sharing devices of the users 301 and 302 are connected to the image-sharing system.

Namely, the image-sharing device of the user 301 acquires information about the states of the image-sharing devices of the users 300 and 302. The image-sharing device of the user 300 is not connected to the image-sharing system and that of the user 302 is connected to the image-sharing system. Then, the image-sharing device of the user 301 transmits the image-data items (309, 310, and so forth) provided by the image-sharing device of the user 302 and information about relations (links) between the image-data items provided by the image-sharing device of the user 302 according to the states of the image-sharing devices of the users 300 and 302, as shown in the frame 303c.

Thus, the image-sharing device of the user 301 changes the details on an output screen image according to a change in the state of the image-sharing device of the user 300 (disconnection from the image-sharing system). More specifically, when the image-sharing device of the user 300 is disconnected from the image-sharing system, namely, when the image-sharing device of the user 300 stops providing data, the image-sharing device of the user 301 outputs the image-data items (307, 309, 310, and so forth) provided by the image-sharing devices of the users 201 and 202 other than the image-sharing device of the user 300 and information about relations (links) between the image-data items provided by the image-sharing devices of the users 201 and 202.

Figure 4:
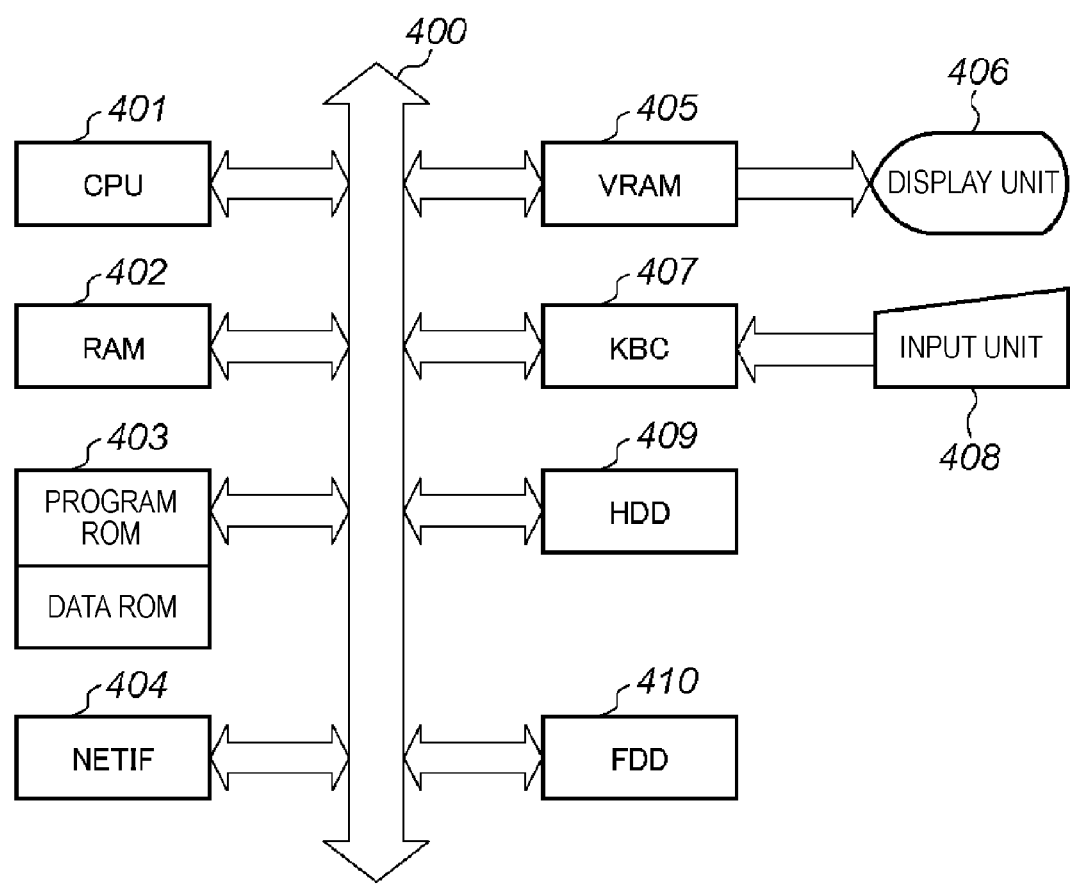
FIG. 4 is a block diagram showing the configuration of an image-sharing device connected to an image-sharing system according to an embodiment of the present invention, where the image-sharing device is configured, as a computer system such as a PC.

FIG. 4 is a block diagram illustrating the configuration of an image-sharing device connected to the image-sharing system according to the first embodiment, where the image-sharing device is configured, as a computer system (a data-processing device) such as a personal computer (PC). The image-sharing device (the data-processing device) may be achieved by using a work station, a notebook PC, a palmtop PC, various types of electric home appliances such as a TV including a computer, and a game machine having a communication function in place of the PC. Further, the image-sharing device may be achieved by using a terminal having a function of communicating with another image-sharing device including a telephone, a facsimile (fax), a mobile phone, an electronic-personal organizer, and so forth, or a combination of a plurality of the above-described terminals.

A CPU 401 is provided, as a central-processing unit (hereinafter referred to as a CPU) controlling the above-described computer system. The CPU 401 executes various types of control processing procedures according to a program loaded to a program read-only memory (hereinafter referred to as a ROM) 403 and/or a random-access memory (hereinafter referred to as a RAM) 402. The RAM 402 functions, as a main memory of the CPU 401, an area of an execution program, an execution area of the program, and a work area recording various data items. Each of various application-software programs executed by the CPU 401 is loaded from a hard disk drive (hereinafter referred to as an HDD) 409 to the RAM 402 and executed, at the execution time. The ROM 403 stores information about steps of processing performed by the CPU 401. The ROM 403 includes a program ROM storing an operating system (OS) functioning, as a system program controlling devices of the computer system, and a data ROM storing information necessary to operate the computer system, for example. Further, the HDD 409 which will be described later may be used in place of the ROM 403.

A network interface (NETIF) unit 404 performs control, so as to transfer and/or receive data to and/or from another computer system via a network. Further, the NETIF unit 404 determines the connection state of the computer systems connected to each other via the network. A video RAM (VRAM) 405 expands an image produced on an image screen of a display unit 406 that will be described later and that shows an operation state of the computer system. Further, the VRAM 405 controls the image production. The display unit 406 includes a liquid-crystal display, a cathode-ray tube, and so forth. A keyboard controller (KBC) 407 controls an input signal transmitted from an input unit 408 having a keyboard, a mouse, and so forth.

The HDD 409 is provided, as an external storage unit configured, as a large-capacity storage unit including an HDD, a magnet-optical (MO) disk drive, and so forth. Various application programs and OSes are installed onto the HDD 49. Further, the HDD 409 is used for storing data such as image data. The application programs according to the first embodiment include a software program executing various device-control units used in the first embodiment, for example. An external input-and-output device (FDD) 410 may be provided, as a compact disk (CD)-ROM drive, so as to input and/or output data stored in a removable storage unit. The FDD 410 is used, so as to read data from a medium of the above-described application program, for example. Further, an application program and/or data which should be recorded onto the HDD 409 may be recorded onto the FDD 410 for use. A system bus 400 is provided, as an input-and-output bus (an address bus, a data bus, and a control bus), so as to connect the above-described units to one another.

Figure 5:
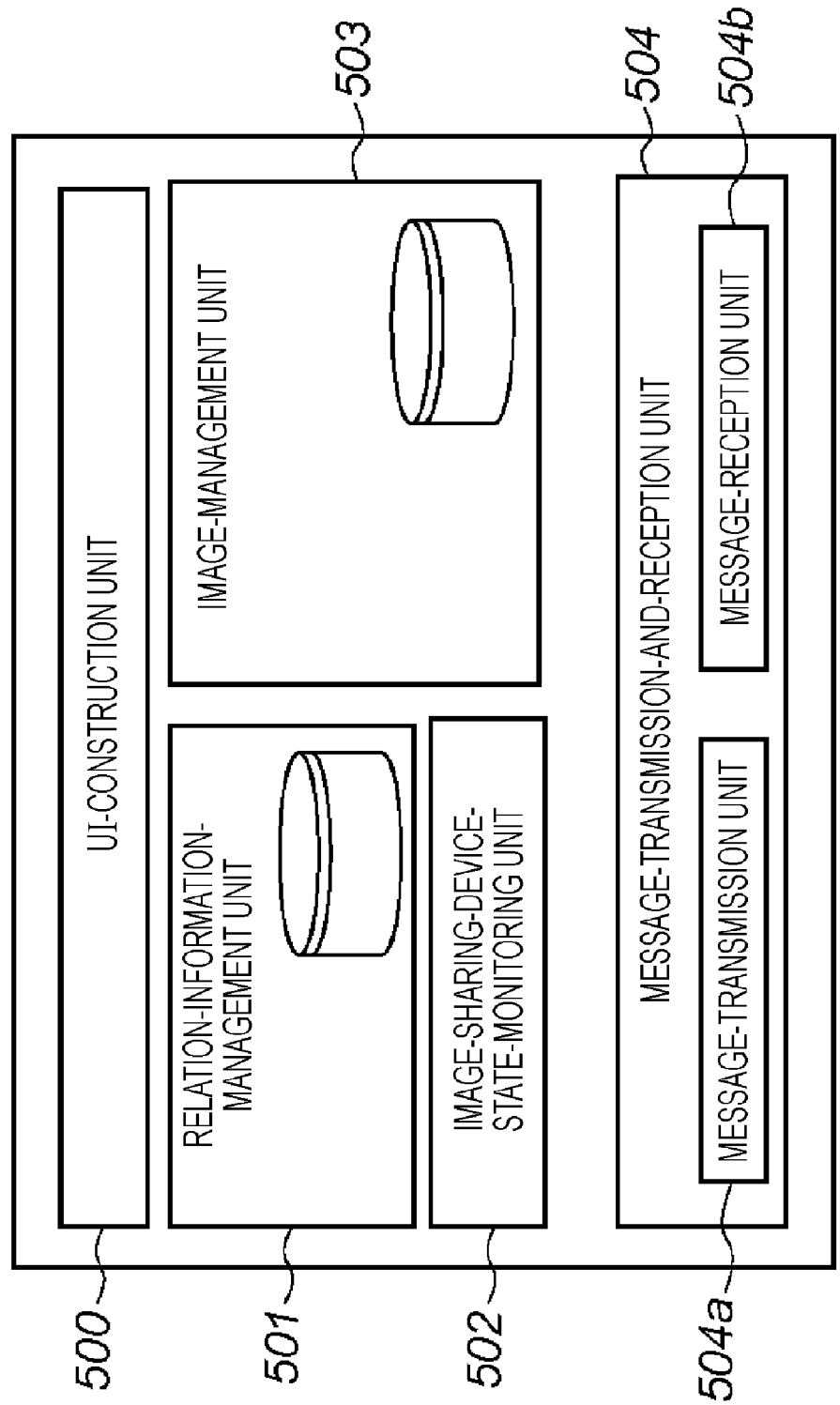
FIG. 5 is a block diagram illustrating an application module executed by an image-sharing device included in the image-sharing system according to an embodiment of the present invention.

FIG. 5 is a block diagram showing functions of an application module executed by an image-sharing device (the data-processing device) included in the image-sharing system according to the first embodiment. An application-software program described below can be achieved by supplying a recording medium recording program code achieving the above-described functions to a system and/or an apparatus, and reading and executing the program code recorded onto the recording medium by a computer of the system and/or the apparatus.

The image-sharing device includes a UI-construction unit 500, a relation-information-management unit 501, an image-sharing-device-state-monitoring unit 502, an image-management unit 503, and a message transmission-and-reception unit 504. Further, the message transmission-and-reception unit 504 includes a message-transmission unit 504a and a message-reception unit 504b. Functions of the above-described units will be described later.

FIG. 6 shows example meta data managed by the image-management unit 503 along with image data in the image-sharing device of the first embodiment. Data items shown in FIG. 6 are provided by way of example. Therefore, the present invention can be achieved without being limited to the above-described data items.

In FIG. 6, the meta data is held by the image-management unit 503. The meta data includes data on images, image-name information 600, photographing-date information 601, photographing-location information 602 and link-destination information 603. The link-destination information 603 includes information indicating to which image of which of the image-sharing devices of users 300, 301, and 302 the above-described image data is related (linked). The relation-information-management unit 501 dynamically constructs information about relations between the entire data items that can be seen in the image-sharing system according to fluctuations in the number of the image-sharing devices connected to the image-sharing system on the basis of the link-destination information 603.

In FIG. 6, an image referred to as A1.jpeg denotes the image-data item 304 shown in FIG. 3 and an image referred to as A3.jpeg denotes the image-data item 305 shown in FIG. 3. Further, an image referred to as B1.jpeg denotes the image-data item 307 shown in FIG. 3 and an image referred to as C3.jpeg denotes the image-data item 309 shown in FIG. 3.

Figure 7:
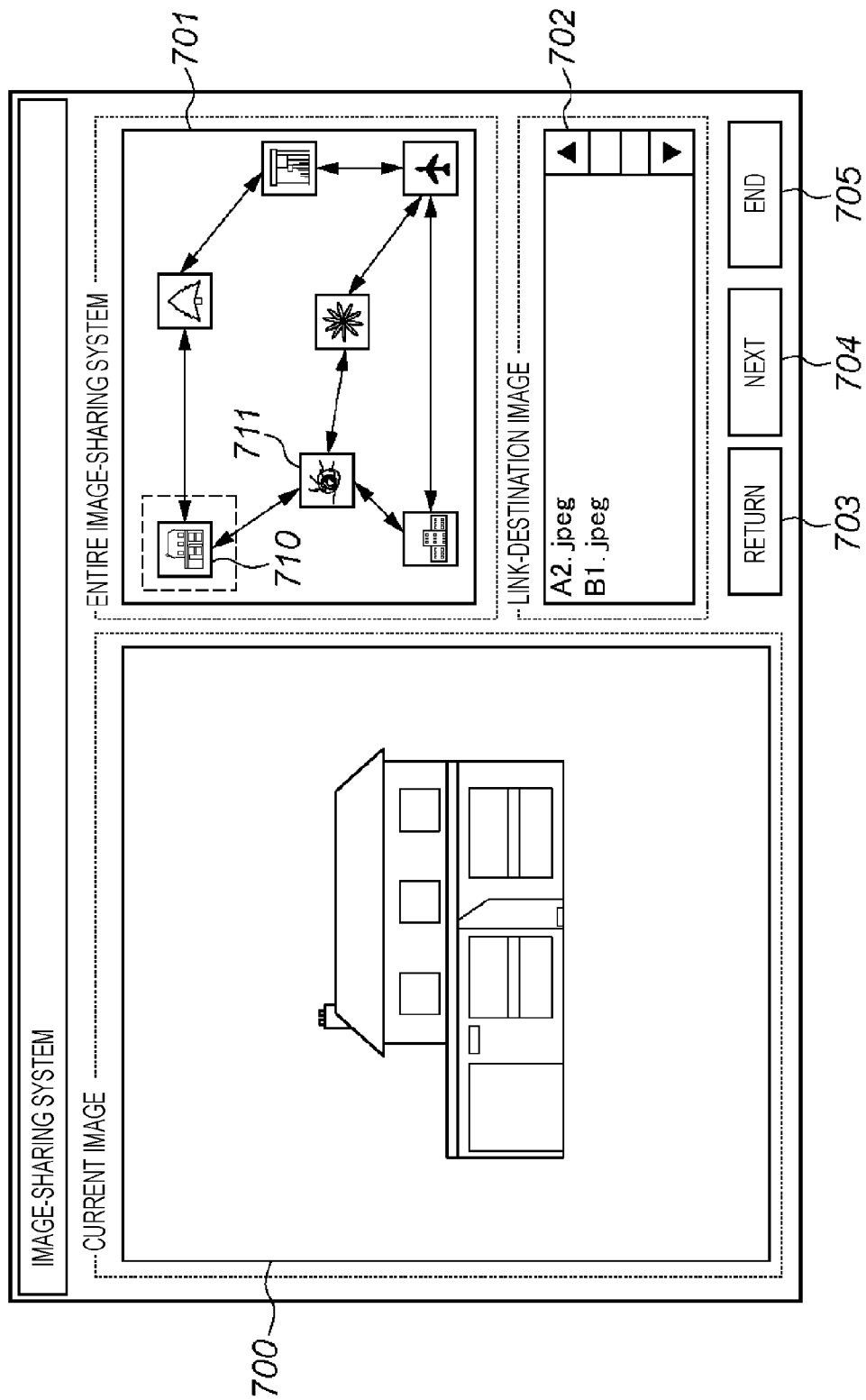
FIG. 7 shows an example user interface constructed by a UI-construction unit of the image-sharing device according to an embodiment of the present invention.

FIG. 7 shows an example user interface constructed by the UI-construction unit 500 of the image-sharing device of the first embodiment. Here, data items shown in FIG. 7 are provided by way of example. That is to say, embodiments of the present invention can be achieved without being limited to the above-described data items.

FIG. 7 shows an example UI-screen image produced on the display unit 406. An image-display unit 700 produces the current display screen image. A link-information-display unit 701 conceptually shows relation (link) information of image-data items that can be used in the image-sharing system by using thumbnails of image-data items existing in the image-sharing system. Each of the frames 303a, 303b, and 303c shown in FIG. 3 shows an example image shown on the link-information-display unit 701. A link-destination list 702 shows a list of image-data items linked to an image-data item shown on the image-display unit 700.

An image 710 shown in FIG. 7 corresponds to the image-data item 304 (the user 300) shown in FIG. 3 and an image 711 corresponds to the image-data item 307 (the user 301) shown in FIG. 3. The image 710 is produced on the image-display unit 700. Since an image A2.jpeg and the image B1.jpeg shown in FIG. 6 are registered, as link destinations, the images A2.jpeg and B1.jpeg are shown on the link-destination list 702.

A return button 703 is provided, so as to instruct the user to return to an image which was shown immediately before the current image produced on the image-display unit 700. A next button 704 is provided, so as to instruct the user to proceed to an image next to the current image produced on the image-display unit 700 and produce an image that is selected by the link-information-display unit 701 and/or selected from among the link-destination list 702. An end button 705 is provided, so as to end the application-software program.

Figure 8:
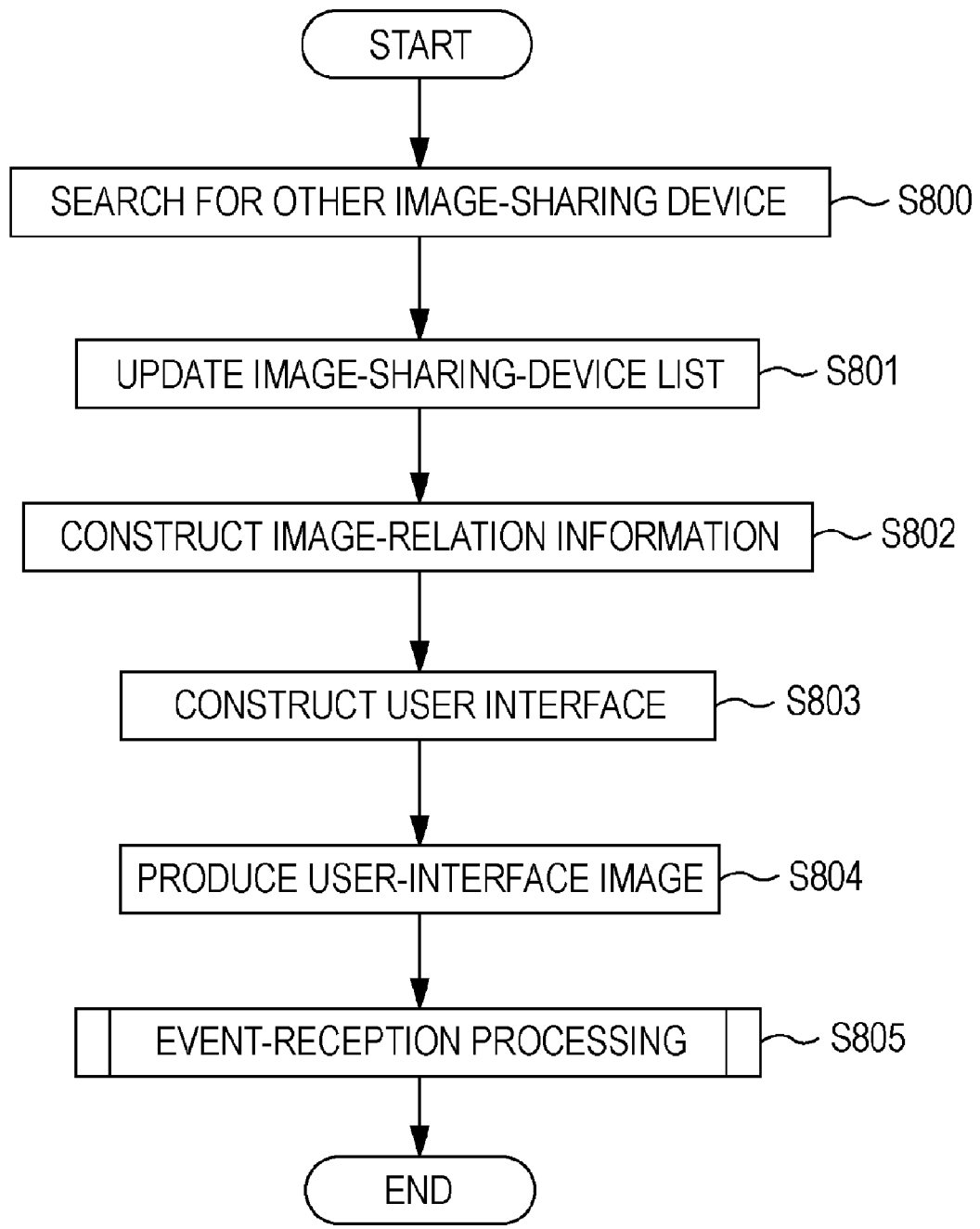
FIG. 8 is a flowchart illustrating processing performed by the image-sharing device included in the image-sharing system according to an embodiment of the present invention.

FIG. 8 is a flowchart illustrating processing procedures performed by the image-sharing device included in the image-sharing system of the first embodiment. A program executing the above-described processing procedures is installed onto the HDD 409. At the execution time, the program is read by the RAM 402 and executed under the control of the CPU 401.

After the above-described program is started, a search is made, at step S800, so as to determine whether or not an image-sharing device other than the above-described image-sharing device is included in the above-described image-sharing system. At that time, the state-monitoring unit 502 transmits a search request from the message-transmission unit 504a to the network. When the search request is transmitted from the message-transmission unit 504a, the Internet Protocol (IP) is used. In that case, both of Internet Protocol version 4 (IPv4) and Internet Protocol version 6 (IPv6) can be used. Further, wire communications and/or radio communications can be actually used, as a medium actually used, as a communication path. Further, communication protocols including Transmission Control Protocol (TCP), User Datagram Protocol (UDP), Hyper Text Transfer Protocol (HTTP), Simple Mail Transfer Protocol (SMTP), Simple Network Management Protocol (SNMP), and File Transfer Protocol (FTP) may be used depending on a device-control protocol.

Next, at step S801, the state-monitoring unit 502 updates an image-sharing-device list on the basis of a search response transmitted from the other image-sharing device to the message-reception unit 504b. The message-reception unit 504b receives data under the same protocol as that used for the above-described message-transmission unit 504a. Then, at step S802, the state-monitoring unit 502 acquires image-relation information held by each of the image-sharing devices that had transmitted the research responses, at step S801. The state-monitoring unit 502 acquires the above-described image-relation information by using the message transmission-and-reception units 504. The acquired image-relation information includes various meta-data items such as the link-destination information 603 shown in FIG. 6, for example.

The relation-information-management unit 501 constructs relation information of the entire image-sharing system on the basis of the acquired image-relation information and image-relation information of image-data items that are managed by the image-management unit 503 and that are held by the image-sharing device performing the processing shown in FIG. 8. Namely, the relation-information-management unit 501 constructs information about relations between image-data items provided by the other image-sharing devices according to the state (connection or disconnection) of the other image-sharing devices. Further, the relation-information-management unit 501 constructs information about relations between image-data items provided by the image-sharing device performing the processing shown in FIG. 8 and the other image-sharing devices according to the states of the other image-sharing devices.

Next, at step S803, the UI-construction unit 500 constructs a user interface (UI) shown on the link-information-display unit 701 on the basis of image-relation information of the entire image-sharing system, the image-relation information being constructed, at step S802. Then, at step S804, an image of the UI is produced for a user, as shown in FIG. 7. Here, the image-display unit 700 produces a predetermined image such as the first image 710 held by the image-sharing device performing the processing shown in FIG. 8. Namely, the UI-construction unit 500 outputs the image data provided by the image-sharing device performing the processing shown in FIG. 8 and the other image-sharing devices, and the relation information constructed by the relation-information-management unit 501.

Then, at step S805, processing is performed for an operation event issued by the user and an event issued by the other image-sharing device via the network. The details on the processing performed, at step S805, will be described with reference to flowcharts shown in FIGS. 9 and 10.

Figure 9:
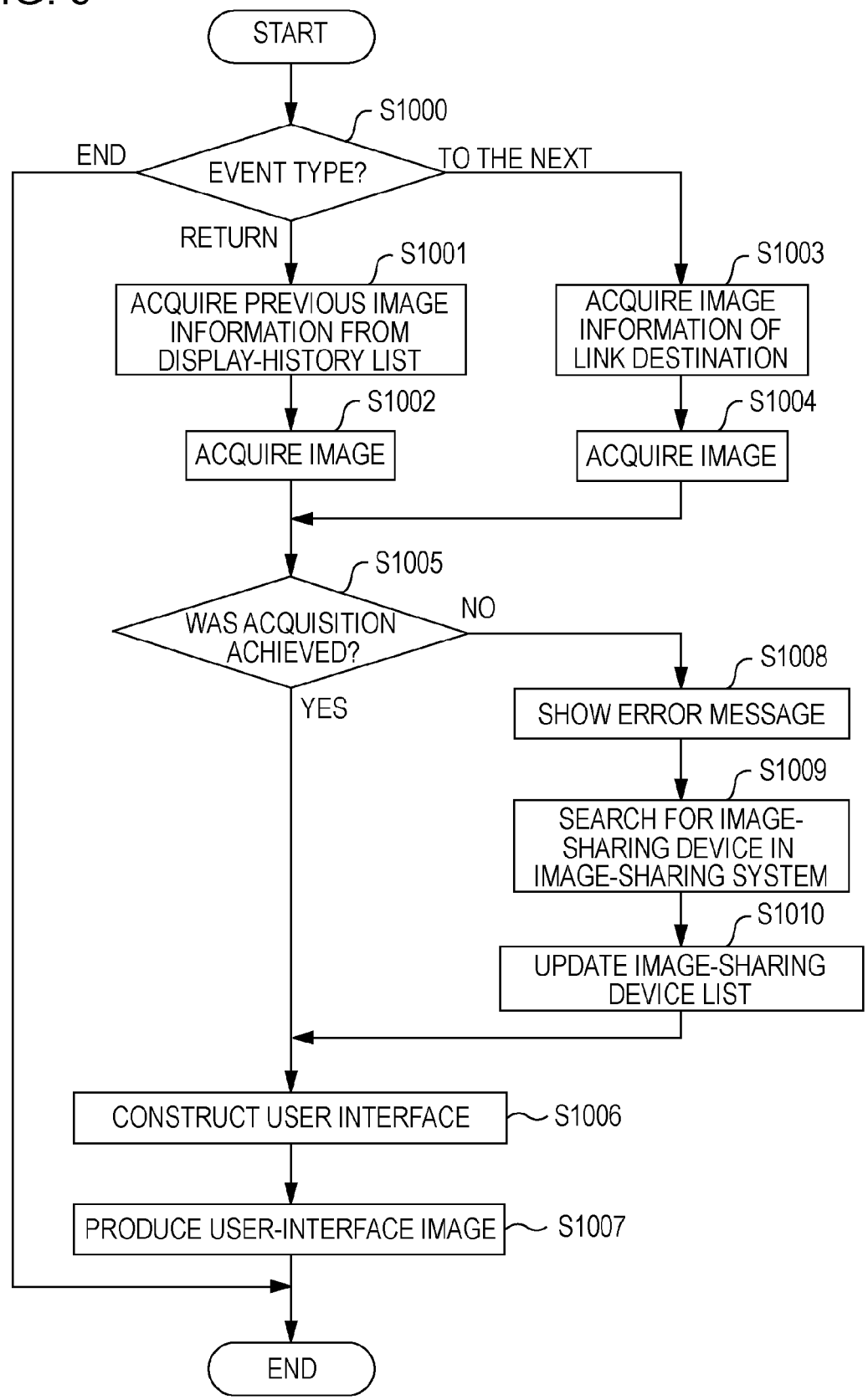
FIG. 9 is a flowchart illustrating UI-event processing according to an embodiment of the present invention.

The flowchart shown in FIG. 9 illustrates UI-event processing performed when the event-reception processing shown in FIG. 8 is performed for the operation event issued by the user. The UI-event processing is performed when the user operates any of the buttons 703 to 705 provided on the screen image shown in FIG. 7.

First, the type of the event transmitted from the UI is determined, at step S1000. If it is determined that the event is issued by the user who clicked on the end button 705 ("End" in step S1000), the processing is terminated. If it is determined that the event is issued by the user who clicked on the return button 703 ("Return" in step S1000), the processing advances to step S1001 where information about an image which is immediately previous to the current image produced on the image-display unit 700 is identified by referring to a display-history list on which information about the history of images produced on the image-display unit 700 is recorded. The above-described dislay-history list is provided in the RAM 402. Then, data on the immediately previous image is acquired, at step S1002. When the image data for acquisition is held in the imageing sharing device performing the processing shown in FIG. 9, the image data is acquired from the image-management unit 503. When the image data for acquisition is held in an image-sharing device other than the above-described imageing sharing device, the image data is acquired by the message transmission-and-reception unit 504 via the network.

On the other hand, if it is determined that the event is issued by the user who clicked on the next button 704 ("To the Next" in step S1000), the processing advances to step S1003 where the next information to be produced is acquired from the link-information-display unit 701 and/or the link-destination list 702. Part of either the link-formation-display information-display unit 701 or the link-destination list 702 is selected. Namely, an image produced on the ink-information-display information-display unit 701, or a line of the link-destination destination list 702 is selected. Then, either the link-information-display information-display unit 701 or the link-destination list 702 including the selected part is determined to be a link destination. Then, at step S1004, data on the image corresponding to the link destination is acquired. If the image data is held in the image-sharing device performing the processing shown in FIG. 9, the image data is acquired from the image-management unit 503. If the image data is held in the other image-sharing device, the image data is acquired by the message transmission-and-reception unit 504 via the network.

After the processing corresponding to steps S1002 and S1004 is performed, the processing advances to step S1005 where it is determined if an image-acquisition has been achieved. If it is determined that the image-acquisition has been achieved, at step S1005, the processing advances to step S1006 where the UI-construction unit 500 produces the image corresponding to the acquired image data on the image-display unit 700 and updates the link-information-display unit 701 and the link-destination list 702 on the basis of image-relation information attached to the produced image. Then, at step S1007, the updated UI shown in FIG. 7 is produced for the user, for example. The above-described image-relation information attached to the produced image is managed by the relation-information-management unit 501.

If it is determined that the data acquisition has failed, at step S1005, the processing advances to step S1008 where an error message is shown for the user. Then, a search is made, so as to determine whether or not an image-sharing device other than the image-sharing device performing the processing shown in FIG. 9 is included in the image-sharing system, at step S1009. At that time, the state-monitoring unit 502 transmits a search request from the message-transmission unit 504a. Then, the state-monitoring unit 502 updates the image-sharing-device list on the basis of a search response that is transmitted from the other image-sharing device and that is received by the message-reception unit 504b, at step S1010. Then, the processing advances to step S1006.

Figure 10:
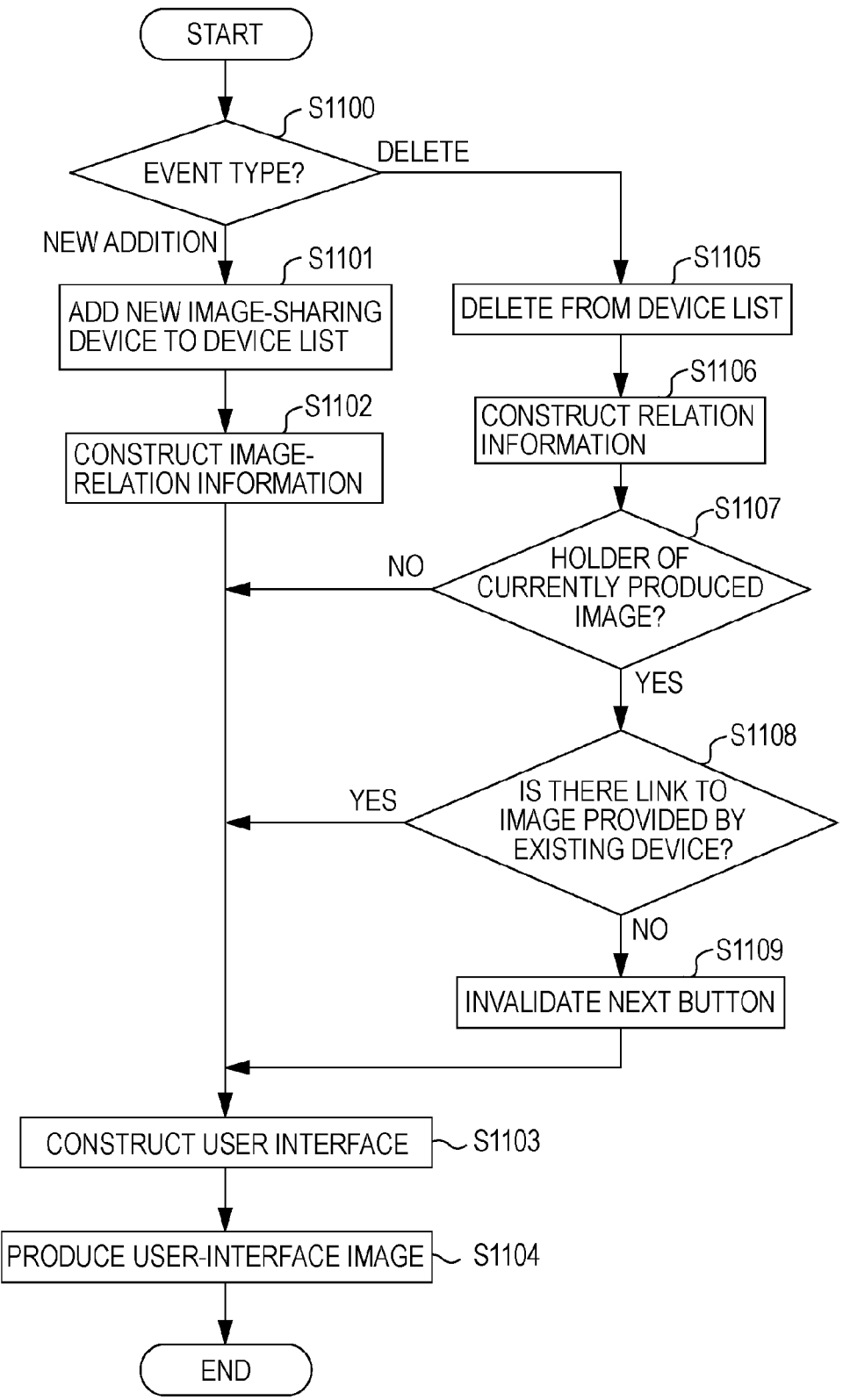
FIG. 10 is a flowchart illustrating network-event processing according to an embodiment of the present invention.

The flowchart shown in FIG. 10 illustrates network-event processing performed when the event-reception processing shown in FIG. 8 is performed for an event issued and transmitted from the other image-sharing device via the network. The network-event processing is performed when the event issued by the other image-sharing device is transmitted to the message-reception unit 504*b*.

First, the type of the event transmitted from the other image-sharing device via the network is determined, at step S1100. If it is determined that the event is issued ("New Addition" in step S1100), so as to add an image-sharing device, the processing advances to step S1101 where the state-monitoring unit 502 adds the image-sharing device which issued the event to the image-sharing-device list. Then, the message transmission-and-reception unit 504 acquires image-relation information of an image-data item held by the image-sharing device that issued the event, at step S1102. The image-relation information acquired at that time includes various meta-data items such as the link-destination information 603 shown in FIG. 6. The above-described image-relation information is managed by the relation-information-management unit 501.

Further, the relation-information-management unit 501 constructs relation information of the entire image-sharing system on the basis of the acquired image-relation information and image-relation information of image-data items that are managed by the image-management unit 503 and that are held by the image-sharing device performing the processing shown in FIG. 10. The relation-information-management unit 501 manages information about names of the image-data items held by the image-sharing device performing the processing shown in FIG. 10, that is, the image-name information (identification information) 600 and the image-name information (identification information) 600 acquired from the other image-sharing device. Further, when the image-sharing device performing the processing shown in FIG. 10 and/or the other image-sharing device does not hold an image-data item having the name information (identification information) of the link-destination information 603 of the image-data item held by the image-sharing device performing the processing shown in FIG. 10, the relation-information-management unit 501 invalidates the link-destination information. Further, when the image-sharing device performing the processing shown in FIG. 10 and/or the other image-sharing device does not hold an image-data item having the name information (identification information) of the link-destination information 603 acquired from the other image-sharing device, the relation-information-management unit 501 invalidates the link-destination information.

Then, the processing advances to step S1103 were the UI-construction unit 500 constructs a UI shown on the link-information-display unit 701 on the basis of the constructed image-relation information of the entire image-sharing system. The UI does not include the invalidated link-destination information. Then, at step S1104, the UI shown in FIG. 7 is produced for the user.

On the other hand, if it is determined that the event is a removal event ("Delete" in step S1100), the processing advances to step S1105 where the image-sharing device which issued the event is removed from the image-sharing-device list. Then, relation information held by the image-sharing device which issued the event is removed, at step S1106. At step S1106, the relation-information-management unit 501 removes the image-relation information (the image-name information 600, the link-destination information 603, and so forth) held by the removed image-sharing device and invalidates the link-destination information 603 determining the removed image-data item to be a link destination. For example, when the image-sharing device of the user 300 is disconnected from the image-sharing system, as shown in the frame 303*c* of FIG. 3, the link-destination information 306 of the image-data item 307 and the link-destination information 308 of the image-data item 309 are invalidated. The invalidated link-destination information is not shown on the link-destination list 702 shown in FIG. 7. That is to say, when the other image-sharing device is removed (when the other image-sharing device stops providing image-data items), image-data items provided by an image-sharing device other than the other image-sharing device and information about the relation between the image-data items provided by the image-sharing device other than the other image-sharing device are shown. However, the present embodiments are not limited to this case. For example, on the link-information-display unit 701 and the link-destination list 702, the invalidated link-destination information may be shown using a dotted line so that it can distinguish from the validated link-destination information.

Then, it is determined whether or not the current image produced on the image-display unit 700 is held by the image-sharing device which issued the event, at step S1107. If the determination result is no, the processing advances to step S1103.

On the other hand, if it is determined that the current image is held by the image-sharing device which issued the event, at step S1107, the processing advances to step S1108 where it is determined whether or not a link is established between the currently produced image and an image-data item held by an image-sharing device other than the image-sharing device which issued the event. If it is determined that the link is established, the processing advances to step S1103. If it is determined that the link is not established, that is to say, if the link established for an image-data item to be linked is cancelled due to the removal of the image-sharing device, the processing advances to step S1109 so that the next button 704 is invalidated. After that, the processing advances to step S1103.

Thus, in the first embodiment, when it is detected that an image-sharing device is newly added and/or removed on the basis of an event received via a network, image-relation information and link-destination information can be updated on the basis of the detection result. Since a UI screen image of an image-sharing system can be produced on the basis of the updated information, a user can easily understand contents including image-data items or the like that can be currently seen.

Second Exemplary Embodiment

Next, a second embodiment of the present invention will be described. Since the basic configurations of an image-sharing system and an image-sharing device according to the second embodiment are generally the same as those of the image-sharing system and the image-sharing device according to the first embodiment, the description thereof is omitted.

Figure 11:
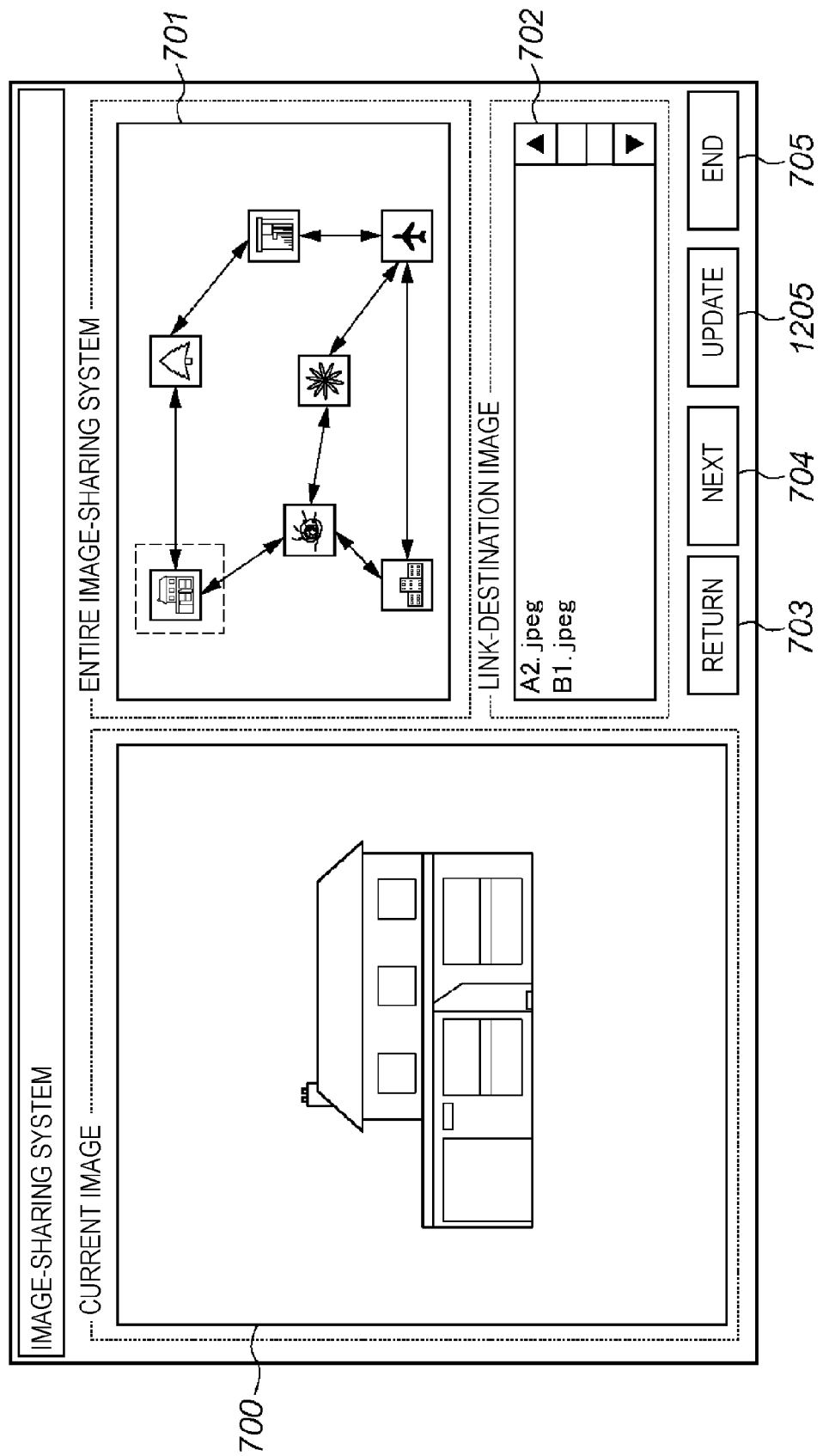
FIG. 11 shows an example user interface constructed by a UI-construction unit according to another embodiment of the present invention.

FIG. 11 shows an example UI constructed by a UI-construction unit 500 according to the second embodiment. Data items shown in FIG. 11 are provided by way of example. Therefore, the present invention can be achieved without being limited to the above-described data items. In FIG. 11, the same parts as those shown in FIG. 7 are designated by the same reference numerals and the description thereof is omitted.

The second embodiment is different from the first embodiment in that an update button 1205 is provided, so as to update the state of the image-sharing system.

The image-sharing device of the image-sharing system according to the second embodiment performs the same processing as the processing described in the flowcharts shown in FIGS. 8 and 10. Therefore, the processing will not be described.

Figure 12:
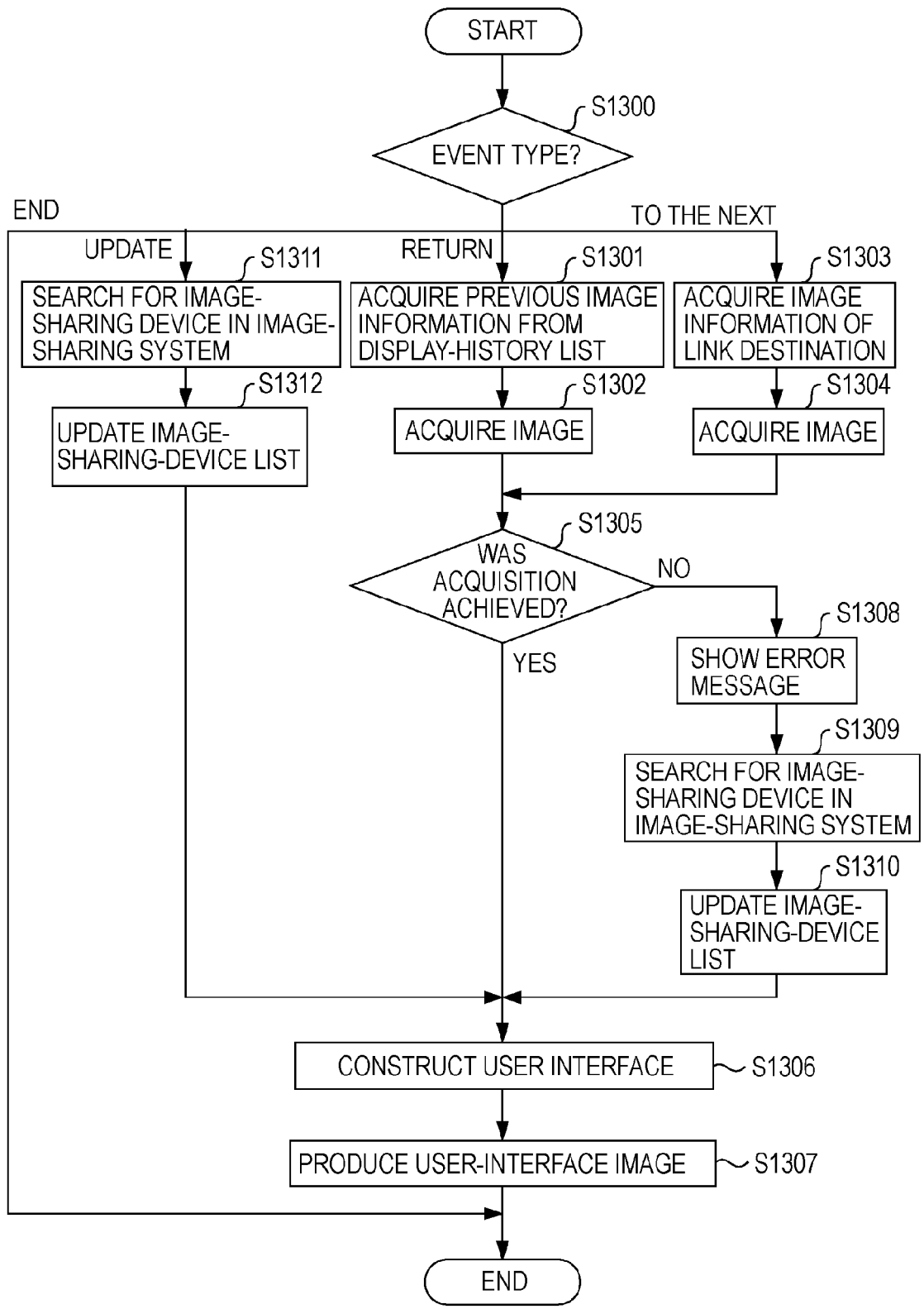
FIG. 12 is a flowchart illustrating UI-event processing (S903) according to the embodiment described in FIG. 11.

FIG. 12 is a flowchart illustrating the UI-event processing according to the second embodiment. Since the processing corresponding to steps S1300, S1301, S1302, S1303, S1304, S1305, S1306, S1307, S1308, S1309, and S1310 (processing performed when the user clicked on the end button 705, processing performed when the user clicked on the return button 703, and processing performed when the user clicked on the next button 704) is the same as the processing corresponding to steps S1000 to S1010 shown in FIG. 9, the description thereof is omitted.

The type of an event issued by a UI is determined, at step S1300. If it is determined that the event is issued by the user who clicked on the update button 1205, the processing advances to step S1311 where a search is made, so as to determine whether or not an image-sharing device other than the image-sharing device performing the processing shown in FIG. 12 is included in the image-sharing system. At that time, the state-monitoring unit 502 transmits a search request from the message-transmission unit 504a. Then, the state-monitoring unit 502 updates the image-sharing-device list on the basis of a search response that is transmitted from the image-sharing device other than the image-sharing device performing the processing shown in FIG. 12 and that is transmitted to the message-reception unit 504b. After that, the processing advances to step S1306.

Thus, the second embodiment allows for updating the state of the image-sharing system through an easy operation in addition to the effect achieved by the first embodiment. Therefore, even though an image-sharing device is removed from the image-sharing system without issuing the removal event, the state of the image-sharing system can be easily updated.

According to the first and second embodiments, static data such as image data, that is, data that had already been downloaded at the display time is handled. Therefore, if contents displayed during reception, such as streaming video are handled, an object to be displayed is lost while the user sees the contents. Subsequently, since it becomes difficult to continue displaying the contents, the next previous contents are displayed again, for example.

In the above-described first and second embodiments, the data-sharing system, the data-sharing device, and the data-sharing method that handle image data, that is, the image-sharing system, the image-sharing device, and the image-sharing method have been described by way of example. However, without being limited to the image data, the present invention can be achieved by using various types of data including text data, sound data, document data, and so forth. In that case, the link-information-display unit 701 shown in each of FIGS. 7 and 12 produces an image, as a thumbnail. However, if it is difficult to produce a data image, as the thumbnail, as is the case with speech data, link information can be shown, as an icon or the like.

Thus, the first and second embodiments can provide a UI that reduces link disconnection for a user even though the P2P-data sharing system is used.

Further, according to the first and second embodiments, information about relations between the entire data items that can be seen in the data-sharing system is dynamically constructed on the basis of relation (link) information included in data items provided by the entire data-sharing systems that are determined to be capable of providing a data item. Subsequently, it becomes possible to construct a data-sharing system including only data items provided by data-sharing devices currently included in the data-sharing system.

Further, according to the first and second embodiments, the UI is dynamically constructed and information about links between data items that can be seen at all times is provided to a user on the basis of information about relations between the entire data items that can be seen in the P2P-data-sharing system. Subsequently, the UI is reconstructed on the basis of reconstructed relation (link) information. Subsequently, it becomes possible to provide information about links between data items that can be seen at all times to the user.

According to another embodiment of the present invention, the state of the P2P-data-sharing system is monitored at all times and the state of another data-sharing device included in the data-sharing system is grasped by receiving an event issued from the above-described data-sharing device. The grasped state of the above-described data-sharing device includes the state where the above-described data-sharing device is connected, the state where the above-described data-sharing device is disconnected, the state where the above-described data-sharing device is connected even though data transmission is difficult, and so forth. Subsequently, it becomes possible to identify a data-sharing device which is currently connected to the P2P-data-sharing system by using the event in the P2P-data-sharing system wherein an end node is not necessarily connected to a network at all times. Thus, it becomes possible to extract data that can be seen in the data-sharing system.

According to still another embodiment of the present invention, the state of the P2P-data-sharing system is monitored at all times and the state of another data-sharing device included in the data-sharing system is grasped by searching the data-sharing system according to a request transmitted from the user (e.g., the update event shown in FIG. 12). Subsequently, the user can find a data-sharing device connected to the P2P-data-sharing system, as required, in the P2P-data-sharing system wherein the end node is not necessarily connected to the network at all times. Thus, it becomes possible to extract data that can be seen in the data-sharing system.

Other Embodiments

Thus, the embodiments of the present invention have been illustrated. However, the present invention can be used for a document-search system including a plurality of devices and/or apparatuses, or a document-search device including a single device and/or apparatus.

The present invention can be achieved by supplying a software program performing functions of the above-described embodiments directly and/or remotely to a system and/or an apparatus, and reading and executing the supplied software program by a computer of the system and/or the apparatus. In the above-described embodiments, the software program corresponds to the flowcharts shown in FIGS. 8, 9, 10, and 12. In that case, the software program may not be essential as long as functions of the software program are provided. Therefore, program code itself installed onto the computer, so as to perform functional processing of the present invention by the computer, may achieve the present invention. Namely, according to Claims of the present invention, a computer program itself performing the functional processing of the present invention may achieve the present invention. In that case, the computer program may not be essential as long as functions of the computer program are provided. For example, object code, a program executed by an interpreter, script data supplied to an OS, and so forth may achieve the present invention.

Various types of recording mediums can be used, so as to supply a program. For example, a hard disk, an optical disk, a magneto-optical disk, an MO, a CD-ROM, a CD-R, a CD-RW, a nonvolatile memory card, a ROM, a DVD (a DVD-ROM and/or a DVD-R), and so forth can be used.

Further, the program can be supplied by accessing a homepage on the Internet by using a browser of a client computer and downloading the program from the homepage to a recording medium such as a hard disk. In that case, the computer program itself according to an embodiment of the present invention and/or a data file that is compressed and that has an automatic-install function may be downloaded. Further, the program code can be supplied by dividing program code included in a program according to an embodiment of the present invention into a plurality of files and downloading the files from different homepages. That is to say, the Claims of the present invention include a World Wide Web (WWW) server downloading program files to a plurality of users, the program files being used for performing the functional processing of the present invention by using a computer.

Further, the program of the present invention may be encoded, recorded onto a recording medium such as the CD-ROM, and distributed to the user. In that case, key information for decoding encoded data maybe downloaded from a homepage to a user who satisfies predetermined requirements via the Internet. By using the key information, an encoded program is installed into the computer in an executable form.

The present invention can be achieved without performing the functions of the above-described embodiments by using the computer executing a read program. Namely, an OS or the like running on the computer on the basis of instructions of the program may perform part of or the entire processing so that the functions of the above-described embodiments are achieved.

Further, a program read from the recording medium may be written into a memory of a function extension board inserted in the computer or a function extension unit connected to the computer. In that case, a CPU or the like provided in the function extension board or the function-extension unit executes part of or the entire processing on the basis of instructions of the program so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-318742 filed on Nov. 1, 2005, which is hereby incorporated by reference herein in its entirety.

What is claimed is:

1. A data-processing device capable of receiving data transmitted from one or more other data-processing devices via a network, the data-processing device comprising:
    a central processing unit configured to control:
    an acquisition unit which acquires state information about a state of the one or more other data-processing devices via the network;
    a memory unit which memorizes link information about a link between a data item corresponding to data recorded in the data-processing device and a data item corresponding to data recorded in the one or more other data-processing devices;
    a determination unit which determines, based on the acquired state information, the one or more data-processing devices which are connected via the network; and
    a display unit which displays a link state based on the link information between the data item corresponding to the data recorded in the data-processing device and a first data item corresponding to first data recorded in a first data-processing device and does not display a link state based on the link information between the data item corresponding to the data recorded in the data-processing device and a second data item corresponding to second data recorded in a second data-processing device in a case where the determination unit determines that the first data-processing device is connected via the network and the second data-processing device is not connected via the network.

2. The data-processing device according to claim 1, further comprising: a providing unit which provides a data item to the one or more other data-processing devices,
    wherein the display unit displays the data items provided by the first data-processing device and the providing unit, and a link state based on the link information between the data items provided by the first data-processing device and the providing unit.

3. The data-processing device according to claim 1, wherein the display unit changes the link state based on the link information, displayed in a display screen, according to a change of the determination by the determination unit.

4. The data-processing device according to claim 1, wherein in a case where the acquisition unit acquires state information indicating that the first data-processing device stops providing the data, the display unit displays the link state based on the link information about a link between the data items which do not include the first data item corresponding to the first data provided by the first data-processing device.

5. The data-processing device according to claim 1, wherein the acquisition unit is connected to the one or more other data-processing devices in a peer-to-peer manner.

6. The data-processing device according to claim 1, wherein the display unit displays a network-model-display image showing the data item provided by the one or more data-processing devices as a thumbnail.

7. The data-processing device according to claim 1, wherein the central processing unit further is configured to control:
    an input unit which inputs an instruction for displaying the data item of the one or more other data-processing devices, which are connected via the network,
    wherein the acquisition unit acquires the state information of the one or more other data-processing devices in accordance with an acquisition error of the data item corresponding to the instruction, and
    the display unit displays the link state based on the state information acquired according to the acquisition error of the data item.

8. A method for controlling a data-processing device including a central processing unit, which is capable of receiving data transmitted from one or more other data-processing devices via a network, the method comprising:
    acquiring, using the central processing unit, state information about a state of the one or more data-processing devices via the network;
    memorizing, using the central processing unit, link information about a link between a data item corresponding to data recorded in the data-processing device and a data item corresponding to data recorded in the one or more other data-processing devices;

determining, using the central processing unit, based on the acquired state information, the one or more data-processing devices which are connected via the network;

displaying, using the central processing unit, a link state based on the link information between a data item corresponding to data recorded in the data-processing device and a first data item corresponding to first data recorded in a first data-processing device and not displaying a link state based on the link information between the data item corresponding to the data recorded in the data-processing device and a second data item corresponding to second data recorded in a second data-processing device in a case where the determining step determines that the first data-processing device is connected via the network and the second data-processing device is not connected via the network.

9. The method according to claim 8, further comprising:

providing a data item to the one or more other data-processing devices, using the central processing unit, wherein the data item provided by the first data-processing device and the data item provided by the providing step, and a link state based on the link information about a link between the data items provided by the first data-processing device and the providing step are displayed.

10. The method according to claim 8, wherein the displaying step changes the link state based on the link information, displayed in a display screen, according to a change of the determination by the determining step.

11. The method according to claim 8, wherein in a case where state information indicating that the first data-processing device stops providing the data is acquired, the displaying step displays the link state based on the link information about a link between the data items which does not include the first data item corresponding to the first data provided by the first data-processing device.

12. The method according to claim 8, wherein the data-processing device is connected to the one or more data-processing devices in a peer-to-peer manner.

13. The method according to claim 8, wherein the displaying step displays a network-model-display image showing the data item provided by the one or more data-processing devices as a thumbnail.

14. The method according to claim 8, further comprising:

inputting, using the central processing unit, an instruction for displaying the data item of the one or more other data-processing devices, which are connected via the network, wherein the state information of the one or more other data-processing devices are acquired in the acquiring step in accordance with an acquisition error of the data item corresponding to the instruction, and the link state based on the state information acquired according to the acquisition error of the data item is displayed in the displaying step.

15. A non-transitory computer-readable medium storing instructions which, when executed by a data-processing device which is capable of receiving data transmitted from one or more other data-processing devices via a network, causes the data-processing device to perform operations comprising:

acquiring state information about a state of the one or more other data-processing devices via the network;

memorizing link information about a link between a data item corresponding to data recorded in the data-processing device and a data item corresponding to data recorded in the one or more other data-processing devices;

determining, based on the acquired state information, the one or more other data-processing devices which are connected via the network; and displaying a link state based on the link information between a data item corresponding to data recorded in the data-processing device and a first data item corresponding to first data recorded in a first data-processing device and not displaying a link state based on the link information between the data item corresponding to data recorded in the data-processing device and a second data item corresponding to second data recorded in a second data-processing device in a case where the determining step determines that the first data-processing device is connected via the network and the second data-processing device is not connected via the network.

16. The non-transitory computer-readable medium according to claim 15, wherein the operations further comprises providing data items to the one or more other data-processing devices.

17. The non-transitory computer-readable medium according to claim 15, wherein the displaying step changes the link information, displayed in a display screen, according to a change of the determination by the determining step.

18. The non-transitory computer-readable medium according to claim 15, wherein in a case where the state information indicating that the first data-processing device stops providing the data is acquired, the displaying step displays link information about a link between the data items which does not include the first data item corresponding to the first data provided by the first data-processing device.

19. The non-transitory computer-readable medium according to claim 15, wherein the data-processing device is connected to the one or more other data-processing devices in a peer-to-peer manner.

20. The non-transitory computer-readable medium according to claim 15, wherein the displaying step displays a network-model-display image showing the data item provided by the one or more data-processing devices as a thumbnail.

21. The non-transitory computer-readable medium according to claim 15, further comprising:

inputting an instruction for displaying the data item of the one or more other data-processing devices, which are connected via the network, wherein the state information of the one or more other data-processing devices are acquired in the acquiring step in accordance with an acquisition error of the data item corresponding to the instruction, and the link state based on the state information acquired according to the acquisition error of the data item is displayed in the displaying step.

22. A data-processing device capable of receiving data transmitted via a network, the data-processing device comprising:

a central processing unit configured to control:

an acquisition unit which acquires state information about a state of other data-processing devices via the network;

a determination unit which determines, based on the acquired state information, one or more other data-processing devices which are connected via the network; and a display unit which displays a link state based on a link between a first data item corresponding to first data recorded in a first data-processing device and a second data item corresponding to second data recorded in a second data-processing device in a case where the determination unit determines that the first data-processing device and the second data-processing device are connected via the network.

* * * * *